United States Patent
Ali et al.

(10) Patent No.: US 11,168,176 B2
(45) Date of Patent: Nov. 9, 2021

(54) AUTOMOTIVE SEAT MADE FROM EPOXIDIZED SOY OIL

(71) Applicant: LEAR CORPORATION, Southfield, MI (US)

(72) Inventors: Asad S. Ali, Troy, MI (US); Paul Fielding, Farwell, MI (US); Virgil Kowalski, Southfield, MI (US); Matthew Phillips, Farwell, MI (US); Zhijie Zhang, Southfield, MI (US); Robert D. Dawe, Sarnia (CA); Calton B. Spivey, Midland, MI (US)

(73) Assignee: Lear Corporation, Southfield, MI (US)

( * ) Notice: Subject to any disclaimer, the term of this patent is extended or adjusted under 35 U.S.C. 154(b) by 123 days.

(21) Appl. No.: 16/144,220

(22) Filed: Sep. 27, 2018

(65) Prior Publication Data

US 2020/0102418 A1    Apr. 2, 2020

(51) Int. Cl.
| | |
|---|---|
| *C08G 18/58* | (2006.01) |
| *C08G 18/18* | (2006.01) |
| *C08G 18/08* | (2006.01) |
| *C08J 9/00* | (2006.01) |
| *C08J 9/12* | (2006.01) |

(52) U.S. Cl.
CPC ........... *C08G 18/581* (2013.01); *C08G 18/14* (2013.01); *C08G 18/18* (2013.01); *C08J 9/0028* (2013.01); *C08J 9/0042* (2013.01); *C08J 9/125* (2013.01); C08G 2110/0025 (2021.01); C08G 2110/0083 (2021.01); C08J 2203/10 (2013.01); C08J 2205/10 (2013.01); C08J 2207/00 (2013.01); C08J 2375/04 (2013.01)

(58) Field of Classification Search
CPC ...... C08G 18/14; C08G 18/161; C08G 18/18; C08G 18/2063; C08G 18/3275; C08G 18/36; C08G 18/4045; C08G 18/4072; C08G 18/48; C08G 18/58; C08G 18/581; C08G 18/63; C08G 18/6696; C08G 2101/0025; C08G 2101/0083; C08J 9/0028; C08J 9/0042; C08J 9/04; C08J 9/125; C08J 2203/10; C08J 2205/10; C08J 2207/00; C08J 2375/04; C08J 2375/08

See application file for complete search history.

(56) References Cited

U.S. PATENT DOCUMENTS

| | | | |
|---|---|---|---|
| 5,482,980 | A | 1/1996 | Pcolinsky |
| 8,617,714 | B2 | 12/2013 | Uemura et al. |
| 10,023,678 | B2 | 7/2018 | Burdeniuc et al. |
| 2009/0286896 | A1* | 11/2009 | Roh ............... C11C 3/006 521/159 |
| 2011/0190408 | A1* | 8/2011 | Casati ............ C08G 18/4804 521/119 |
| 2012/0208912 | A1 | 8/2012 | Takayuki et al. |
| 2013/0197114 | A1* | 8/2013 | Burdeniuc ....... C08G 18/302 521/128 |

FOREIGN PATENT DOCUMENTS

| | | |
|---|---|---|
| CN | 1926164 A | 3/2007 |
| CN | 101955649 A | 1/2011 |
| CN | 101974144 A | 2/2011 |
| CN | 102574974 A | 7/2012 |
| CN | 103703043 A | 4/2014 |
| JP | 2005320431 A | 11/2005 |
| JP | 2008056779 A | 3/2008 |

OTHER PUBLICATIONS

Office Action dated May 8, 2021 (and machine translation) for Chinese Appn. No. 201910486723X, 15 pgs.
CN 103703043 A, U.S. Pat. No. 10,023,678 B2.
CN 102574974, US 2012/0208912 A1.

* cited by examiner

*Primary Examiner* — John M Cooney
(74) *Attorney, Agent, or Firm* — Brooks Kushman P.C.

(57) ABSTRACT

A composition for forming polyurethane foams is provided using epoxidized triglycerides with unopened rings. The composition further includes a polyol, a blowing agent, and a catalyst that catalyzes the reaction of polyols with isocyanates to form polyurethanes. The polyol is a polyoxyalklylene and the epoxidized triglyceride is an epoxidized soybean oil. A method for forming polyurethane foam using the aforementioned composition is also provided.

17 Claims, 1 Drawing Sheet

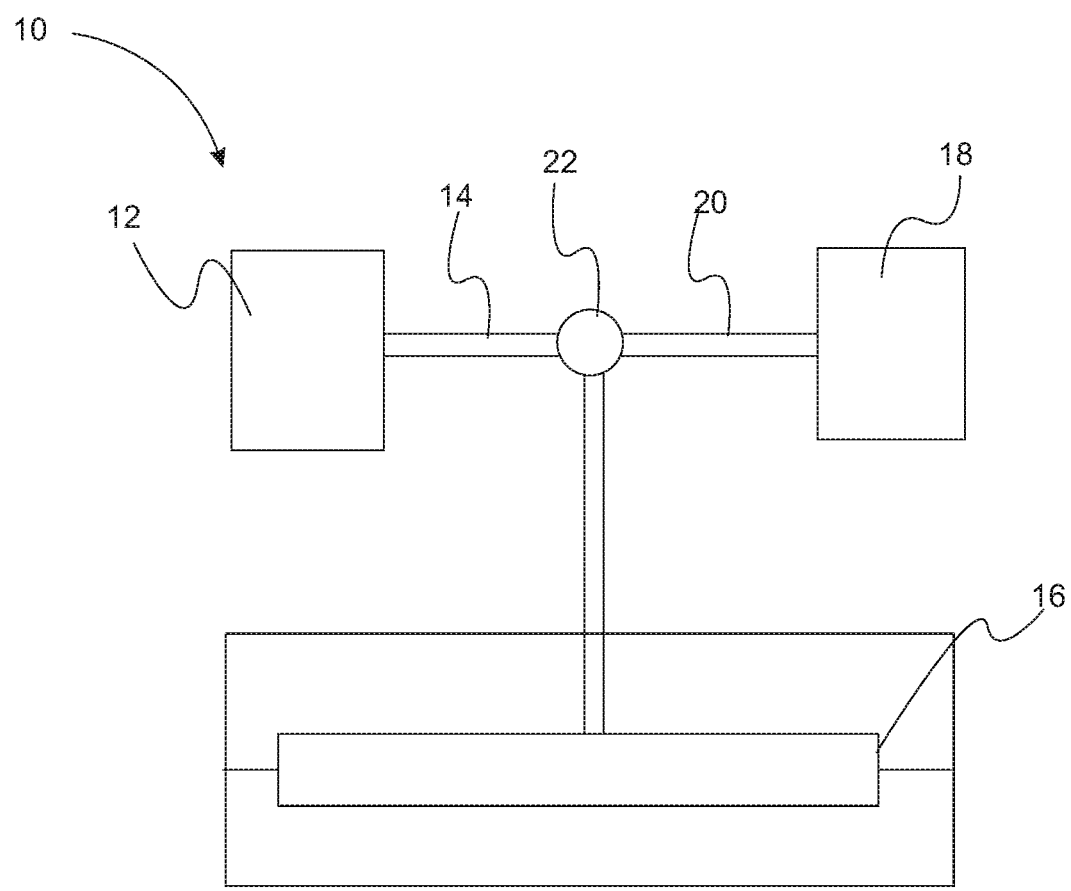

AUTOMOTIVE SEAT MADE FROM EPOXIDIZED SOY OIL

TECHNICAL FIELD

In at least one aspect, the present invention is related to formulations and methods for making foamed urethanes and in particular, for making foamed urethane cushion components for vehicle seats.

BACKGROUND

Polyurethane foam for automotive seats is generally made with nonrenewable petroleum-based polyols. These polyols are coupled with isocyanate, blowing agents, catalysts and several additives. Though the process is successful, the use of petroleum is harmful to the environment. In addition, this practice is unsustainable because the reservoirs for petroleum are being depleted. Thus, there is a need for alternative materials that can successfully create polyurethane foams for automotive seats.

Soy based materials are being used in manufacturing to promote sustainability. These materials are renewable and less harmful to the environment. Soy based materials reduce carbon use and energy expended in the manufacturing process. Soy based materials such as epoxidized soybean oil, can replace small quantities of petroleum polyols during polyurethane foam production. This replacement creates foam seats with comparable safety, firmness and performance as their petroleum counterparts.

Accordingly, there is a need for compositions that utilize renewable triglycerides in raw forms to ensure sustainability and decrease negative environmental effects.

SUMMARY

In one aspect, a composition for forming polyurethane foams is provided using epoxidized triglycerides with unopened rings. The composition further includes a polyol, a blowing agent, and a catalyst that catalyzes the reaction of polyols with isocyanates to form polyurethanes. The polyol is a polyoxyalklylene and the epoxidized triglyceride is an epoxidized soybean oil.

In another aspect, a method for forming polyurethane foams is provided. The method provides a first source of a polyol-containing composition that includes epoxidized soybean oil with unopened epoxide rings, polyol, blowing agent and catalyst mixture. A second source of isocyanate is further provided. The first source and second source are fluidly connected to a molding apparatus. The polyol composition and the isocyanate are provided to the molding apparatus thereby facilitating the formation of the polyurethane foam.

Advantageously, the polyurethane foams can be used in any number of automotive applications where foam is present. For example, the foams can be used in seat cushions, head restraints (i.e., headrests), armrests, and the like.

BRIEF DESCRIPTION OF THE DRAWINGS

FIG. 1 provides a schematic of a molding apparatus for forming polyurethane foam.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "epoxidized soybean oil" means a mixture of organic compounds obtained from the epoxidation of soybean oil. This mixture includes fatty acid chains that include epoxy groups. Soybean oil includes triglycerides with ester linkages formed from the unsaturated fatty acids alpha-linolenic acid, linoleic acid, or combinations thereof and the saturated acid oleic acid. In a refinement, epoxidized soybean oil includes epoxidized linoleum having formula I:

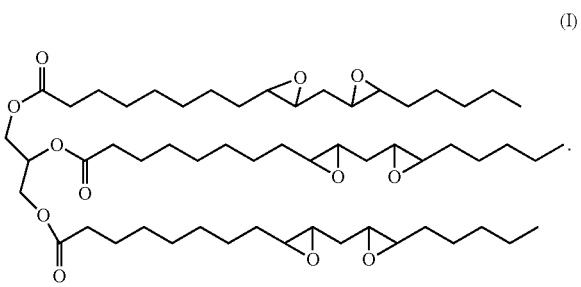 [SMILES: CCCCCC1OC1CC1OC1CCCCCCCC(=O)OCC(COC(=O)CCCCCCCC1OC1CC1OC1CCCCC)OC(=O)CCCCCCCC1OC1CC1OC1CCCCC]

(I)

It should be appreciated that any C—H group herein can be substituted with an alkyl group, halide, nitro, cyano, hydroxyl, and the like.

The term "polyol" means an organic compound that contains at least two hydroxyl groups.

The term "unopened epoxide ring" means that at least 95% of the epoxide rings on the triglyceride are unopened. In a refinement, it means that at least 90% of the epoxide rings are unopened. In yet another refinement, it means that at least 80% of the epoxide rings are unopened. In a further refinement, "unopened epoxide ring" means that at least 70% of the epoxide rings on the triglyceride are unopened.

The term "hydroxyl number" used herein means the milligrams of potassium hydroxide needed to neutralize the acetic acid resulting from the acetylation of one gram of a substance with a free hydroxyl group.

The term "flashpoint" used herein means the lowest temperature at which a volatile material's vapors will ignite.

The term "specific gravity" used herein means the ratio of the density of a substance to the density of water.

In an embodiment, a polyol-containing composition for forming polyurethane foams is provided. The composition includes a polyol, an epoxidized triglyceride with unopened epoxide rings, a blowing agent, and a catalyst that catalyzes the reaction of polyols with isocyanates to form polyurethanes. The epoxidized triglycerides includes fatty acid chains including a component selected from the group consisting of epoxidized alpha-linolenic acid, epoxidized linoleic acid, oleic acid, and combinations thereof. In a refinement, the epoxidized triglycerides are selected from the group consisting of natural and partially hydrogenated epoxidized vegetable oils. In a further refinement, the epoxidized triglyceride includes epoxidized linoleum. Examples of epoxidized vegetable oils include the epoxidized versions of corn oil, palm oil, soybean oil, cottonseed oil, peanut oil, rapeseed oil, safflower oil, canola, rice bran oil, sunflower oil, and combinations thereof. Preferred for this invention are corn oil, cottonseed oil, soybean oil, canola oil and palm oil, and most preferred are soybean oil and palm oil. Typically, the composition is formed and maintained at a temperature from about 60 to 70° F.

In a variation, the polyol is a polyol polymer and in particular, a polyoxyalkylene polyol. In a refinement, the polyol is a polyoxyalkylene polyol, with a hydroxyl number ranging from 30.0 to 33.0 mg KOH/g, a specific gravity of 1.03, a flash point of 171° C., and density of 8.59 lb/gal. In a variation, the polyoxyalkylene polyol has a hydroxyl number ranging from 18.2 to 22.2 mg KOH/g, a specific gravity of 1.6, a flash point of 213° C., and a density of 8.80 lb/gal. In a variation, the polyol is present in an amount from about 80 to 95 weight percent of the total weight of the composition for forming polyurethane foams. In another variation, the polyol is present in an amount from about 83 to 93 weight percent of the total weight of the composition for forming polyurethane foams. In a further variation, the polyol is present in an amount from about 85 to 90 weight percent of the total weight of the composition for forming polyurethane foams.

In a variation, the epoxidized triglyceride is an epoxidized soybean oil with unopened epoxide rings. The soybean oil replaces a portion of the polyol used in polyurethane foam formation to decrease use of petroleum based polyols and increase sustainability. In a refinement, the epoxidized soybean oil has a flashpoint of 299° C. and a density of 1.04 g/mL. In a refinement, the epoxidized soybean oil has a flashpoint of 299° C. and a density of 1.04 g/mL. In a variation, the weight ratio of the epoxidized triglyceride to the polyol is less than 0.5. In a variation, the weight ratio of the epoxidized triglyceride to the polyol is from about 0.2 to 0.3. In a further variation, the weight ratio of the epoxidized triglyceride to the polyol is from about 0.05 to 0.15. Separately, the epoxidized triglyceride is present in an amount from about 2 to 10 weight percent of the total weight of the composition for forming polyurethane foams. In a variation, the epoxidized triglyceride is present in an amount from about 6 to 9 weight percent of the total weight of the composition for forming polyurethane foams. In a variation, the epoxidized triglyceride is present in an amount from about 7 to 8 weight percent of the total weight of the composition for forming polyurethane foams.

In a variation, the composition for forming polyurethane foams includes the reaction product of the polyol and the epoxidized triglyceride.

In another variation, the composition further comprises isocyanate added before foam formation. When the composition includes an isocyanate, the composition is a reactive composition that can form a polyurethane foam. These isocyanates are selected from a group consisting of aliphatic, cycloaliphatic, arilphatic, and/or aromatic isocyanates. Typically, the isocyanate is a triisocyanate and/or a diisocyanate. In a refinement, the isocyanate is a triisocyanate. Examples of suitable triisocyanates include, but are not limited to, 1,3,5-triisocyanate, toluene 2,4,6-triisocyanate, triphenylmethane 4,4',4" triisocyanate, or the like and/or combinations thereof. In a refinement, the isocyanate is a diisocyanate. Examples of suitable diisocyanates include, but are not limited to, tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, pentamethylene 1,5-diisocyanate, butylene 1,4-diisocyanate, 1-isocyanato-3,3,5-trimethyl-5 isocyanatomethylcyclohexane (isophorone diisocyanate, IPDI), 1,4- and/or 1,3-bis (isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethylbiphenyl diisocyanate, 1,2-diphenylethane diisocyanate, and/or phenylene diisocyanate, and/or combinations thereof.

In a refinement, a crosslinker is added to the composition for forming polyurethane foams. The crosslinker allows for increased rigidity and prevents the foam from collapsing. Examples of suitable crosslinkers include, but are not limited to, diethanolamine, glycerine, triethanolamine, trimethylpropane or the like and combinations thereof. In a refinement, the crosslinker is present in an amount from about 1 to 5 weight percent of the total weight of the composition for forming polyurethane foams. In a variation, the crosslinker is present in an amount from about 2 to 4 weight percent of the total weight of the composition for forming polyurethane foams. In yet another variation, the crosslinker is present in an amount from about 2.5 to 3.5 weight percent of the total weight of the composition for forming polyurethane foams.

In an embodiment, the catalyst includes gel catalysts, blow catalysts, or combinations thereof. In a variation, a tertiary amine is used as the catalyst in the polyol and isocyanate reaction, to facilitate proper foam expansion. The tertiary amine is selected from a group consisting of 1,4-diazabicyclo(2,2,2)octane, bis(2,2-dim ethyl amino)ethyl ether, N-ethylmorpholine, diethylenetriamine, triethylenediamine and glycol solutions, or the like and combinations thereof.

In a preferred variation, a combination of tertiary amines is used as the catalyst. In a refinement of the variation that includes a combination of tertiary amines, the compounds present are 1,4-diazabicyclo(2,2,2)octane, triethylenediamine/glycol solutions, and diethanolamine. The 1,4-diazabicyclo(2,2,2)octane is a 33 weight percent solution of triethylenediamine in dipropylene glycol, with a flashpoint of 110° C. and a density of 1.02 g/mL. The triethanoldiamine/glycol solutions have a specific gravity of 1.115 and a flashpoint less than 93° C. The diethylenediamine solution has a flash point less than 110° C. and a density of 1.025 g/mL. In a refinement, the combination of tertiary amines is present in an amount from about 0.1 to 4 weight percent of the total weight of the composition for forming polyurethane foams. In a variation, the combination of tertiary amines is present in an amount from about 0.3 to 3.5 weight percent of the total weight of the composition for forming polyurethane foams. In yet another refinement, the combination of tertiary amines is present in an amount from about 0.7 to 2.5 weight percent of the total weight of the composition for forming polyurethane foams.

In a variation, additives selected from a group comprising of surfactants, coloring agents, plasticizers, stabilizers and/or combinations thereof is provided. In a refinement, the additive is a silicone-based surfactant that stabilizes the foam during the isocyanate and polyol reaction. In a refinement, the silicone-based surfactant has a hydroxyl number of 79 mg KOH/g and a flash point of 184° C. In a further refinement, the silicone-based surfactant has a hydroxyl number of 69 mg KOH/g and a flash point of 64° C. In a variation, the silicone-based surfactant is present in an amount from about 0.2 to 4 weight percent of the total eight of the composition for forming polyurethane foams. In a variation, the silicone-based surfactant is present in an amount from about 0.5 to 3.5 weight percent of the total weight of the composition for forming polyurethane foams. In a further variation, the silicone-based surfactant is present in an amount from about 0.6 to 2 weight percent of the total weight of the composition for forming polyurethane foams.

In another variation, a blowing agent is added to the composition for forming polyurethane foams. The blowing agent is a volatile compound that reacts with isocyanate to create gasses. These gases reduce density and facilitate the formation of rigid foams. In a refinement, the compound is selected from a group consisting of water, acetone, methanol, halogenated alkenes, ethyl acetate and/or combinations thereof. In a variation, the blowing agent used is water, present in an amount from about 0.5 to 5 weight percent of the total weight of the composition for forming polyurethane foams. In a refinement, the blowing agent is present in amount from about 0.8 to 4 weight percent of the total weight of the composition for forming polyurethane foams. In yet another refinement, the blowing agent is present in an amount from about 1.2 to 3 weight percent of the total weight of the composition for forming polyurethane foams. In a refinement, the balance of the composition is water.

With reference to FIG. 1, a method for forming polyurethane foams in a molding apparatus 10 is illustrated. First source 12 provides a polyol-containing composition that is mixture of the polyol, the epoxidized triglyceride with unopened rings, the blowing agent, and the catalyst as set forth above. Details of the polyol-containing are set forth above. The mixture is released into a conduit 14 and then into a mold 16. Second source 18 provides an isocyanate. The isocyanate is directed into a conduit 20 and then into the mold 16. The catalyst from the first source 12 provides an efficient pathway for isocyanate and polyol to react within the mold 16. The additives and blowing agents from the first source 12 ensure proper foam rigidity and structure during the reaction between the isocyanate and the polyol. Mixing of the isocyanate and the polyol composition may occur at mixing station 22 to form the reactive composition set forth above. Once the reaction is complete, a polyurethane foam utilizing epoxidized triglycerides with unopened rings is formed. Examples of application of the foam include seat cushions, head restraints (i.e., headrests), armrests, and the like.

The following examples illustrate the various embodiments of the present invention. Those skilled in the art will recognize many variations that are within the spirit of the present invention and scope of the claims.

Table 1 provides a control composition for polyurethane foam formation without the epoxidized soybean oil is illustrated. The polyol present is a polyoxyalkylene, the crosslinker is diethanolamine, and the catalyst present is a combination of tertiary amines. The amines present are 1,4-diazabicyclo(2,2,2)octane, triethylenediamine/glycol solutions, and diethanolamine. The blowing agent is water. Table 2 provides a composition for polyurethane foam formation with the epoxidized soybean oil is illustrated. The polyol present is a polyoxyalkylene and the weight ratio of the epoxidized soybean oil to the polyoxyalkylene is 0.08. The crosslinker is diethanolamine, and the catalyst is a combination of tertiary amines. The amines present are 1,4-diazabicyclo(2,2,2)octane, triethylenediamine/glycol solutions, and diethanolamine. It should be appreciated that the values in the table are exemplary data. Any of the values can be substituted for an amount +/−20 weight percent of the total weight composition for forming polyurethane foams. Advantageously, the compositions of the invention are found to product foams with nearly equal performance to foams not including the epoxidized soybean oil.

TABLE 1

Control composition for polyurethane foam formation without epoxidized soybean oil.

| % Weight | Material |
|---|---|
| 58-62 | polyoxyalkylene polyol |
| 30-36 | polymer polyol |
| 0 | epoxidized soybean oil with unopened epoxy groups |
| 0.5-3 | Crosslinker |
| 0.1-0.3 | Gel Catalyst |
| 0.1-0.3 | Blow Catalyst |
| 0.1-2.0 | Co-surfactant 1 (silicone based surfactant) |
| 0.1-0.3 | Co-surfactant 2 (silicone based surfactant) |
| balance | H₂O ADDED |
| 100 | TOTAL |
| 0.335021 | [RESIDUAL H₂O]* |

*Residual water represents the water content already present in some of the components prior to a water add.

TABLE 2

Composition for polyurethane foam formation including epoxidized soybean oil with unopened epoxide rings.

| % Weight | Material |
|---|---|
| 50-55 | polyoxyalkylene polyol |
| 30-36 | polymer polyol |
| 7.6065 | epoxidized soybean oil with unopened epoxy groups |
| 1.0-3.0 | Crosslinker |
| 0.1-0.3 | Gel Catalyst |
| 0.1-0.3 | Blow Catalyst |
| 0.1-2.0 | Co-surfactant 1 (silicone based surfactant) |
| 0.1-0.3 | Co-surfactant 2 (silicone based surfactant) |
| balance | H₂O ADDED |
| 100 | TOTAL |
| 0.335021 | [RESIDUAL H₂O] |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A composition for forming polyurethane foams, the composition comprising:
   a polyol;
   an epoxidized triglyceride with unopened epoxide rings wherein at least 95% of epoxide rings on the epoxidized triglyceride with unopened epoxide rings are unopened and the weight ratio of the epoxidized triglyceride with unopened epoxide rings are to the polyol is less than 0.5 and wherein the epoxidized triglyceride with unopened epoxide rings is present in an amount from about 2 to 10 weight percent of the total weight of the composition for forming polyurethane foams, the epoxidized triglyceride with unopened epoxide rings including an epoxidized linoleum having formula I:

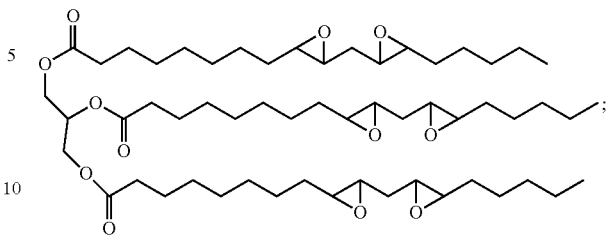

(I)

a blowing agent; and
   a catalyst that catalyzes reaction of polyols with isocyanates to form polyurethanes.

2. The composition of claim 1 wherein the weight ratio of the epoxidized triglyceride with unopened epoxide rings to the polyol is from about 0.02 to 0.3.

3. The composition of claim 1 wherein the epoxidized triglyceride with unopened epoxide rings is an epoxidized vegetable oil.

4. The composition of claim 1 wherein the epoxidized triglyceride with unopened epoxide rings is epoxidized soybean oil.

5. The composition of claim 1 wherein the epoxidized triglyceride with unopened epoxide rings is present in an amount from about 2 to 10 weight percent of the total weight of the composition for forming polyurethane foams.

6. The composition of claim 1 wherein the polyol is present in an amount from 80 to 95 weight percent of the total weight of the composition for forming polyurethane foams.

7. The composition of claim 1 wherein the epoxidized triglyceride with unopened epoxide rings includes fatty acid chains including a component selected from the group consisting of epoxidized alpha-linolenic acid, epoxidized linoleic acid, oleic acid, and combinations thereof.

8. The composition of claim 1 further comprising a reaction product of the polyol and the epoxidized triglyceride with unopened epoxide rings.

9. The composition of claim 1 wherein the polyol is a polyol polymer.

10. The composition of claim 1 wherein the polyol is a polyoxyalkylene polyol.

11. The composition of claim 1 further comprising isocyanate added prior to foam formation, selected from the group consisting of aliphatic, cycloaliphatic, arilphatic, aromatic isocyanates, and combinations thereof.

12. The composition of claim 11 wherein the isocyanate is a diisocyanate selected from the group consisting of tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, and combinations thereof and/or a triisocyanate selected from the group consisting of 1,3,5-triisocyanate, toluene 2,4,6-triisocyanate, triphenylmethane 4,4',4" triisocyanate, and combinations thereof.

13. The composition of claim 1 wherein the catalyst to form the polyurethanes is a tertiary amine selected from the group consisting of 1,4-diazabicyclo(2,2,2)octane, bis(2,2-dimethylamino)ethyl ether, N-ethylmorpholine, diethylenetriamine, triethylenediamine/glycol solutions, and combinations thereof.

14. The composition of claim 1 further comprising an additive selected from the group consisting of surfactants, coloring agents, plasticizers, stabilizers, and combinations thereof.

15. The composition of claim 14 wherein the additive is a silicone-based surfactant, present in an amount from about 0.2 to 4 weight percent of the total weight of the composition for forming polyurethane foams.

16. The composition of claim 1 wherein the blowing agent is selected from the group consisting of water, acetone, methanol, halogenated alkenes, ethyl acetate, and combinations thereof.

17. A method for forming polyurethane foams in a molding apparatus, the method comprising:
  directing a polyol composition into a mold, the polyol composition including a mixture of an epoxidized triglyceride with unopened rings, a polyol, a blowing agent and a catalyst, wherein at least 95% of epoxide rings on the epoxidized triglyceride with unopened epoxide rings are unopened and the weight ratio of the epoxidized triglyceride with unopened epoxide rings are to the polyol is less than 0.5 and wherein the epoxidized triglyceride with unopened epoxide rings are is present in an amount from about 2 to 10 weight percent of the total weight of the composition for forming polyurethane foams, the epoxidized triglyceride with unopened epoxide rings including an epoxidized linoleum having formula I:

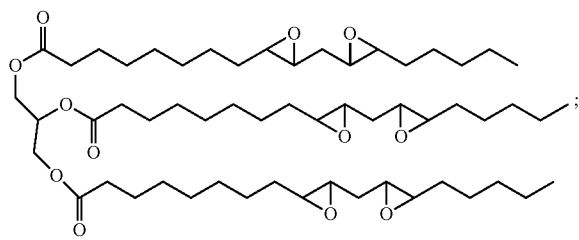

and
directing an isocyanate composition into the mold to form a foamed polyurethane.

* * * * *